US010525917B2

(12) United States Patent
Shen et al.

(10) Patent No.: US 10,525,917 B2
(45) Date of Patent: Jan. 7, 2020

(54) BUMPER COVER RETAINERS FOR BUMPER ASSEMBLIES

(71) Applicant: TOYOTA MOTOR ENGINEERING & MANUFACTURING NORTH AMERICA, INC., Erlanger, KY (US)

(72) Inventors: Mingher Fred Shen, Ann Arbor, MI (US); Nicholas H. Augustyn, Ypsilanti, MI (US); Revathy Dasan Muthiah, Saline, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 78 days.

(21) Appl. No.: 15/686,486

(22) Filed: Aug. 25, 2017

(65) Prior Publication Data
US 2019/0061657 A1   Feb. 28, 2019

(51) Int. Cl.
B60R 19/02 (2006.01)
B60R 19/44 (2006.01)
B60R 19/50 (2006.01)
B60Q 1/04 (2006.01)
B60R 19/18 (2006.01)
B60R 21/34 (2011.01)

(52) U.S. Cl.
CPC .......... B60R 19/023 (2013.01); B60Q 1/0408 (2013.01); B60R 19/18 (2013.01); B60R 19/44 (2013.01); B60R 19/50 (2013.01); B60R 21/34 (2013.01); B60R 2019/1886 (2013.01); B60R 2019/505 (2013.01); B60R 2021/343 (2013.01)

(58) Field of Classification Search
CPC ....... B60R 19/023; B60R 19/44; B60R 19/50; B60R 21/34; B60R 2021/313; B60R 2019/505; B60R 2021/343; B60R 2019/1886; B60R 19/18; B60Q 1/0408
See application file for complete search history.

(56) References Cited

U.S. PATENT DOCUMENTS

| 4,786,093 | A | * | 11/1988 | Nishii | ..................... B60R 19/50 293/120 |
| 6,428,065 | B2 | | 8/2002 | Sato et al. | |
| 8,672,382 | B2 | | 3/2014 | Schinke et al. | |
| 8,827,333 | B2 | | 9/2014 | Ota et al. | |
| 2003/0141729 | A1 | | 7/2003 | Burkhardt et al. | |

FOREIGN PATENT DOCUMENTS

JP   4389847 B2   12/2009

* cited by examiner

Primary Examiner — D Glenn Dayoan
Assistant Examiner — Melissa A Black
(74) Attorney, Agent, or Firm — Dinsmore & Shohl LLP

(57) ABSTRACT

A vehicle, front end assembly, and a method for creating a front end assembly including an upper bumper cover portion including an upper wall, a lower wall, and an exterior wall facing forward in a vehicle-longitudinal direction that extends between the upper wall and the lower wall and a bumper cover retainer that extends along a width of a rear edge of the upper wall, the bumper cover retainer having a sidewall engaging the upper wall of the upper bumper cover portion as the upper wall deflects rearward in the vehicle-longitudinal direction in response to a front impact to the upper bumper cover portion to inhibit movement of the upper wall rearward in the vehicle-longitudinal direction.

20 Claims, 7 Drawing Sheets

US 10,525,917 B2

BUMPER COVER RETAINERS FOR BUMPER ASSEMBLIES

TECHNICAL FIELD

The present specification generally relates to bumper assemblies for vehicles and, more specifically, to bumper assemblies including bumper cover retainers.

BACKGROUND

Vehicles may be equipped with bumper assemblies and impact protection structures that elastically and plastically deform to absorb energy in the event of an impact. A number of standards and tests for evaluating such assemblies currently exist. For example, methods have been developed to assess the protection of an adult pedestrian by simulating leg-impact conditions during a car-to-pedestrian impact. Generally, under some leg impact testing conditions, a bumper assembly that more evenly distributes forces in a vehicle-vertical direction can reduce a bending moment on a leg impactor. Reducing such a bending moment can improve leg impact test results.

SUMMARY

In one embodiment, a vehicle includes an upper bumper cover portion including an upper wall, a lower wall, and an exterior wall facing forward in a vehicle-longitudinal direction that extends between the upper wall and the lower wall. The vehicle further includes a a bumper cover retainer that extends along a width of a rear edge of the upper wall, the bumper cover retainer having a sidewall engaging the upper wall of the upper bumper cover portion as the upper wall deflects rearward in the vehicle-longitudinal direction in response to a front impact to the upper bumper cover portion to inhibit movement of the upper wall rearward in the vehicle-longitudinal direction.

In another embodiment, a front end assembly for a vehicle includes an upper bumper cover portion including an upper wall, a lower wall, and an exterior wall facing forward in a vehicle-longitudinal direction that extends between the upper wall and the lower wall. The front end assembly further includes a bumper cover retainer that extends along a width of a rear edge of the upper wall, the bumper cover retainer having a sidewall engaging the upper wall of the upper bumper cover portion as the upper wall deflects rearward in the vehicle-longitudinal direction in response to a front impact to the upper bumper cover portion to inhibit movement of the upper wall rearward in the vehicle-longitudinal direction.

In yet another embodiment, a method of changing a characteristic of a front end assembly includes providing an upper bumper cover portion including an upper wall, a lower wall, and an exterior wall facing forward in a vehicle-longitudinal direction that extends between the upper wall and the lower wall. The method further includes providing a bumper cover retainer that extends along a width of a rear edge of the upper wall, the bumper cover retainer having a sidewall engaging the upper wall of the upper bumper cover portion as the upper wall deflects rearward in the vehicle-longitudinal direction in response to a front impact to the upper bumper cover portion to inhibit movement of the upper wall rearward in the vehicle-longitudinal direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a bumper assembly that includes an upper bumper cover portion forming an upper bumper region that extends in a vehicle-lateral direction. The bumper assembly includes a bumper cover retainer that is disposed behind the upper bumper cover portion. The bumper cover retainer inhibits rearward movement of the upper bumper cover portion in a vehicle-longitudinal direction. Such a reinforcement using the bumper cover retainer can provide a more even distribution of impact forces under leg impact test conditions.

In the embodiments described herein, the phrase "vehicle-longitudinal direction" refers to the forward-rearward direction (i.e., the +/−x direction of the coordinate axes in the figures). The phrase "vehicle-vertical direction" refers to the upward-downward direction (i.e., the +/−z direction of the coordinate axes in the figures). The phrase "vehicle-lateral direction" refers to the left-right direction (i.e., the +/−y direction of the coordinate axes in the figures). Further, the terms "inboard" and "outboard" are used to describe the relative positioning of various components of the vehicle with respect to a centerline of the vehicle. As used herein, the term "front impact" refers to the impact that results when an object collides with the front end of a vehicle, possibly resulting in the deformation or translation of bumper assembly components with respect to the vehicle and damage or injury to the object.

Motor vehicles that incorporate elements according to the present disclosure may include a variety of construction methodologies that are conventionally known, including the unibody construction methodology as well as a body-on-frame construction methodology.

Figure 1:
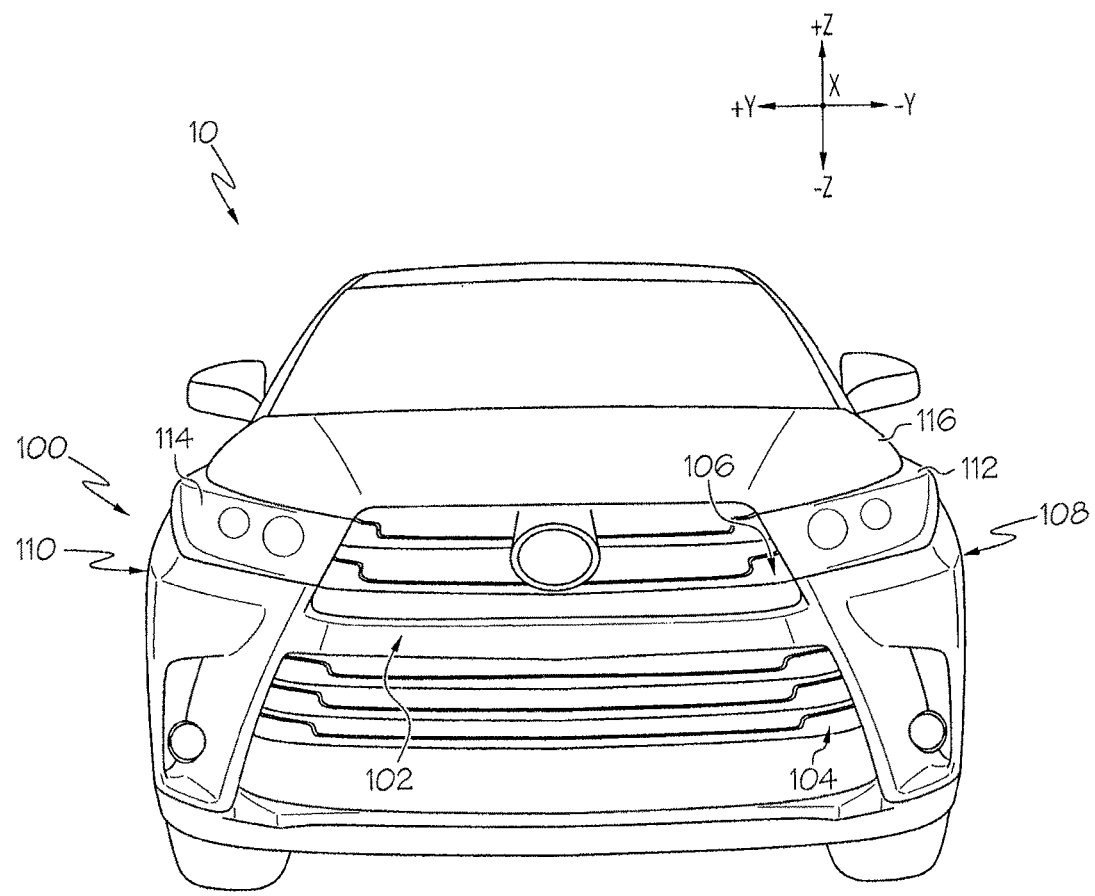
FIG. 1 depicts a front view of a vehicle with a bumper assembly positioned at the front of the vehicle according to one or more embodiments shown and described herein.

Referring to FIG. 1, a vehicle 10 includes a front end assembly 100. The front end assembly 100 includes an upper bumper cover portion 102 that extends in a vehicle-lateral direction of the vehicle 10. The front end may further include a lower grille assembly 104 and an upper grille assembly 106 with the upper bumper cover portion 102 disposed therebetween. The vehicle 10 may also include front fenders 108 and 110 disposed at opposite sides of the upper grille assembly 106 and the lower grille assembly 104 with headlamp assemblies 112 and 114. A hood 116 may be located above the upper grille assembly 106 that provides a cover for an engine compartment.

Figure 2A:
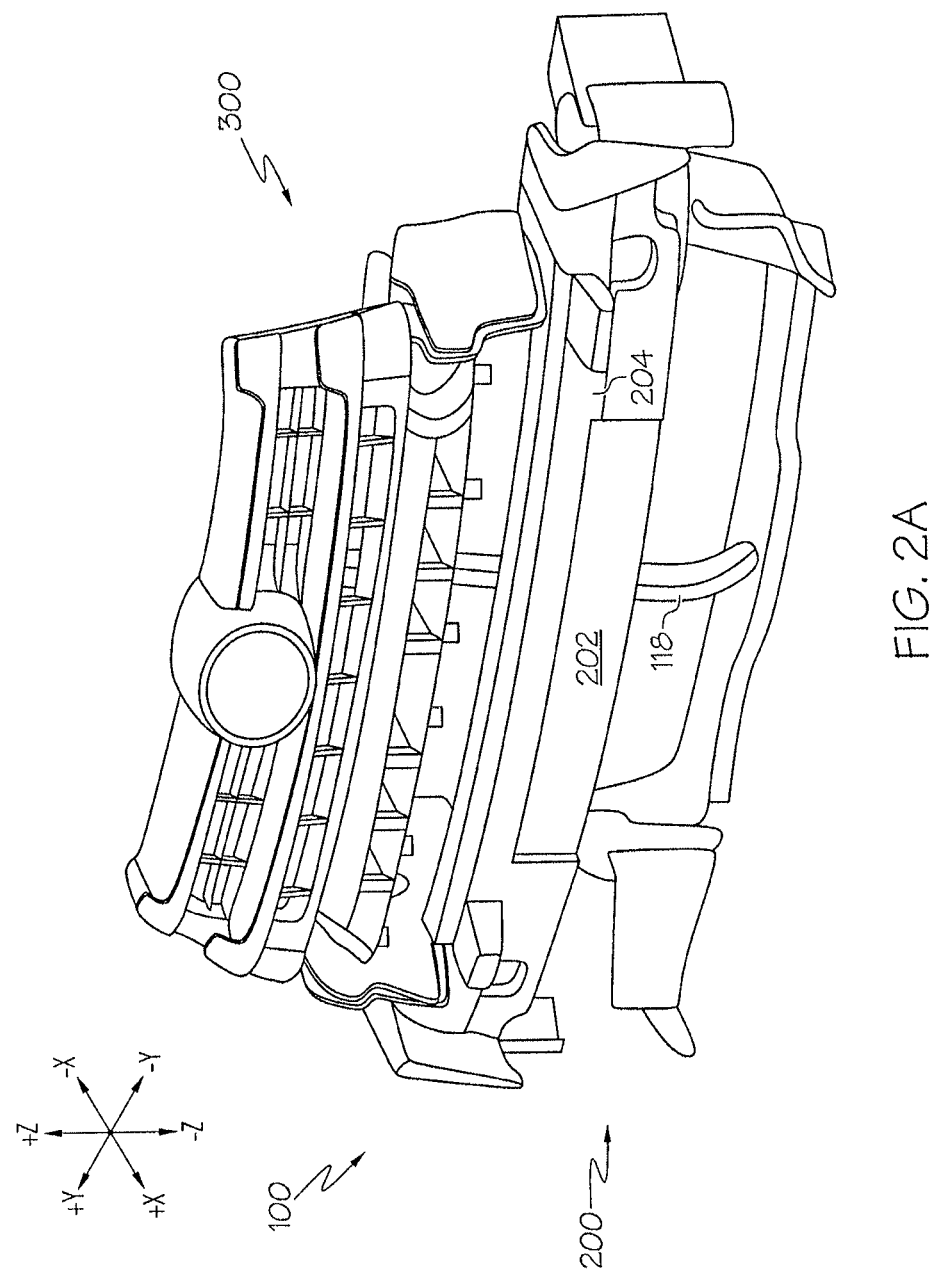
FIG. 2A depicts a front perspective view of the bumper assembly of the vehicle of FIG. 1 with a front fascia removed according to one or more embodiments shown and described herein.
Figure 2B:
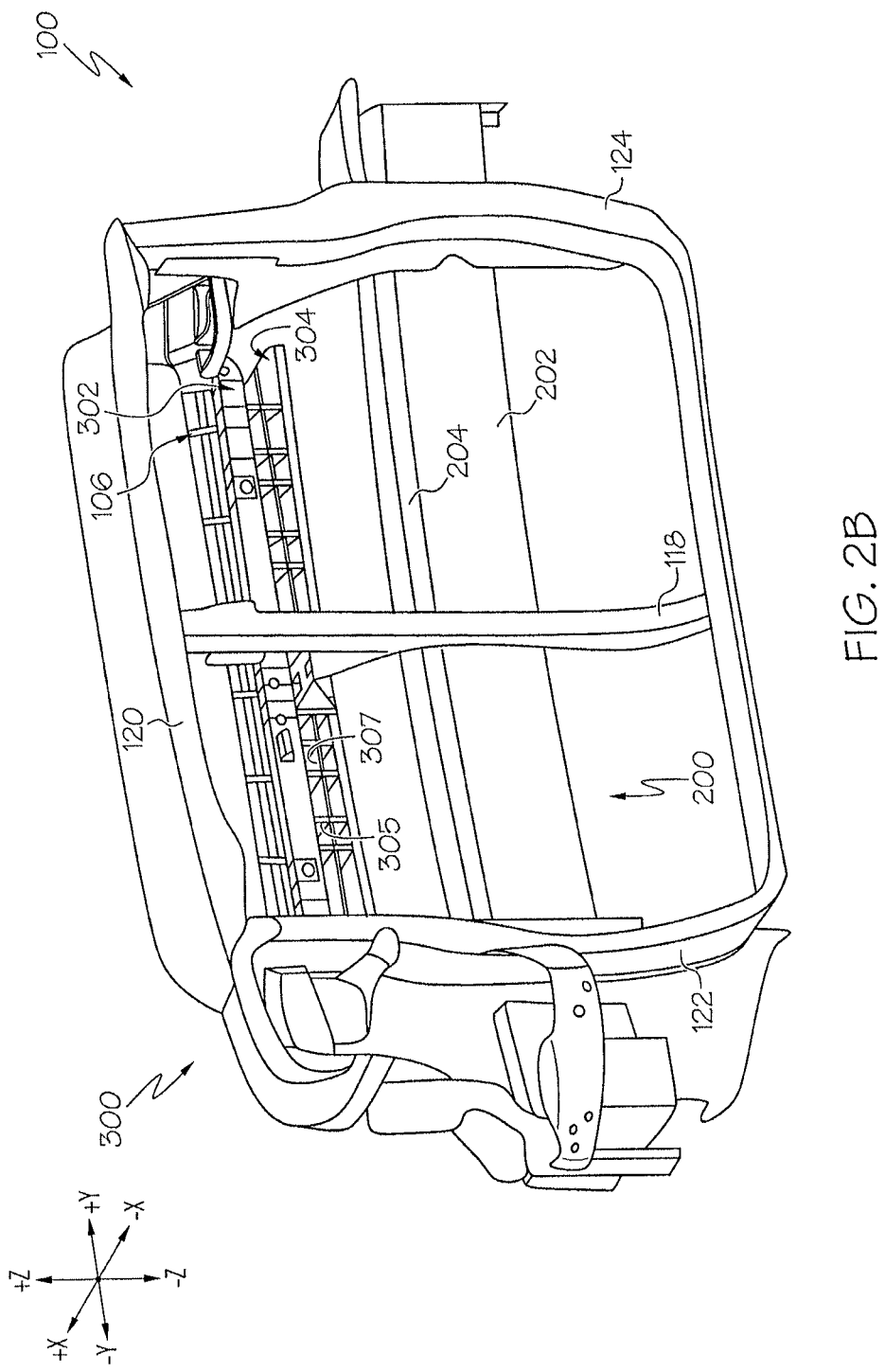
FIG. 2B depicts a rear perspective view of the bumper assembly of the bumper assembly of FIG. 2A according to one or more embodiments shown and described herein.

Referring to FIGS. 2A and 2B, embodiments of the front end assembly 100 may further include a bumper assembly 200 that includes a bumper reinforcement beam 202. The bumper reinforcement beam 202 may be connected to side members and extends in a vehicle-lateral direction. The front end assembly 100 may further includes a radiator support beam 118, a cross support beam 120, and side support beams 122, 124. The radiator support beam 118 may couple an upper bumper cover retainer assembly 300 with the bumper assembly 200, and extends generally in the vehicle-vertical direction. In some embodiments, the radiator support beam 118 may be coupled to the lower grille assembly 104 and the upper grille assembly 106. The bumper reinforcement beam 202 may be constructed from steel, carbon fiber, plastic or combinations thereof.

The upper bumper cover retainer assembly 300 may be located above the bumper reinforcement beam 202 in the vehicle-vertical direction. The upper bumper cover retainer assembly 300 may be coupled to the radiator support beam 118, the upper bumper cover portion 102, and/or the headlamp assemblies 112, 114. In some embodiments, the upper bumper cover retainer assembly 300 may extend substantially the entire width of the upper bumper cover portion 102. In some embodiments, the upper bumper cover retainer assembly 300 may extend a portion of the width of the front end assembly 100, for example 50%, 75%, 80%, 90% or more of the width of the upper bumper cover portion 102.

The upper bumper cover retainer assembly 300 may include a bumper cover retainer 302 and a retainer support structure 304. In some embodiments, the retainer support structure 304 is rearward of the upper bumper cover portion 102 such that deflection of the upper bumper cover portion 102 during front impact causes the upper bumper cover portion 102 to contact the retainer support structure 304. As shown in FIG. 2B, the retainer support structure 304 may include vertical walls 305 and horizontal walls 307 forming a somewhat honeycomb structure. The vertical walls 305 and horizontal walls 307 may increase the strength of the retainer support structure 304 in the vehicle-longitudinal direction. The retainer support structure 304 can support the upper bumper cover portion 102 and reduces or eliminates deflection of the upper bumper cover portion 102 under certain front impacts. The vertical walls 305 and horizontal walls 307 may be formed from plastic and have a high strength to weight ratio such that the retainer support structure 304 deflects little during a front impact but does not add substantially to the overall weight of the vehicle 10. The retainer support structure 304 may include an upper portion 334 and a lower portion 332 as shown in FIG. 3.

In some embodiments, the bumper cover retainer 302 is located behind the upper portion 334 of the retainer support structure 304. The bumper cover retainer 302 may be positioned such that rearward motion of the upper bumper cover portion 102 is retained. The bumper cover retainer 302 may be coupled to the upper bumper cover portion 102 through one or more holes 326 (FIG. 4B) through the bumper cover retainer 302.

Figure 3:
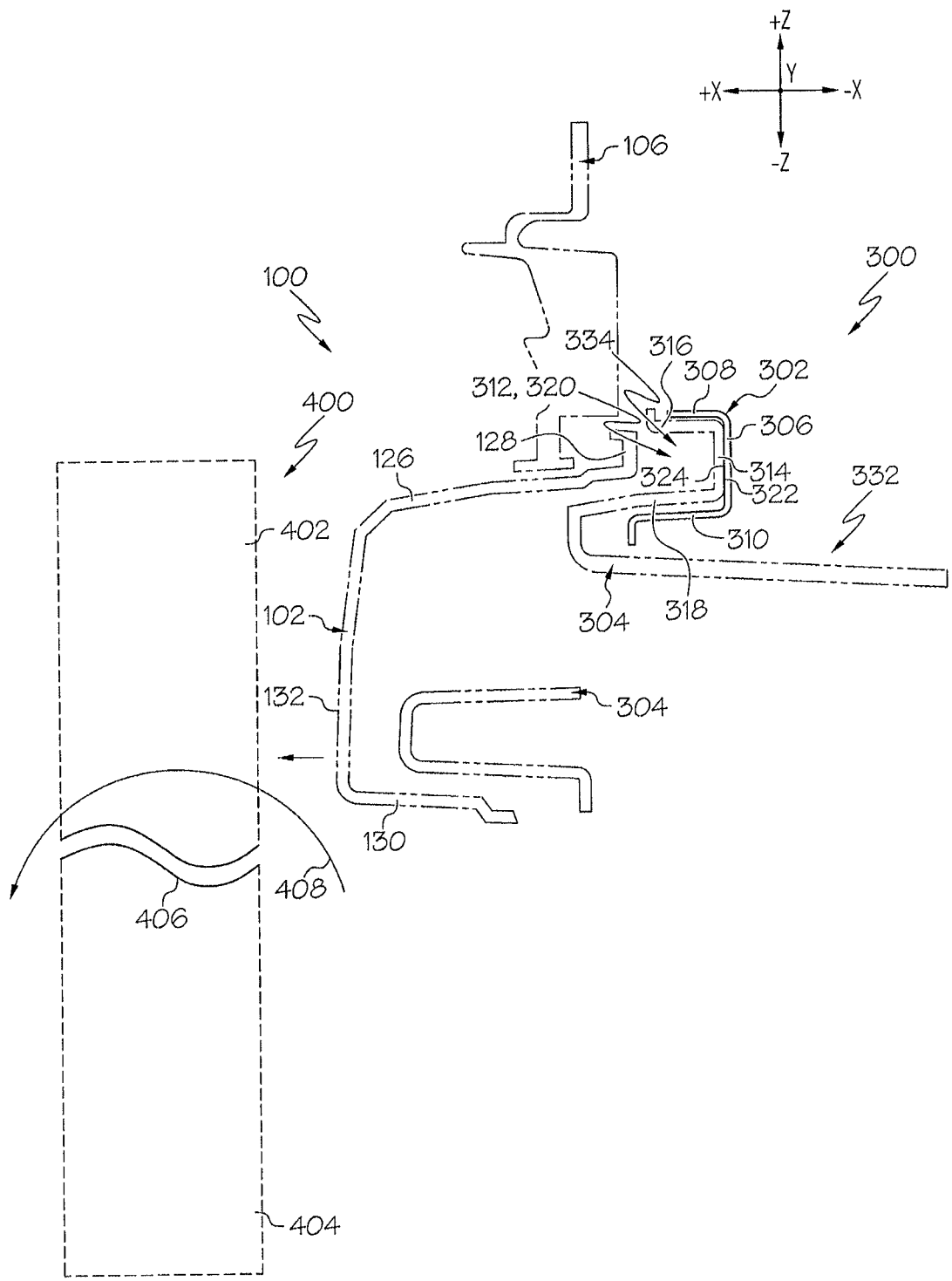
FIG. 3 depicts a schematic cross sectional side view of an upper bumper cover portion and a bumper cover retainer of the bumper assembly of FIG. 1 according to one or more embodiments shown and described herein.

Referring now to FIG. 3, the bumper cover retainer 302 may include a sidewall 306. The bumper cover retainer 302 may include an upper side 308 and a lower side 310. The upper side 308 and the lower side 310 may be generally parallel and opposed to one another in the vehicle-vertical direction forming a space 312 for the placement of the retainer support structure 304. The retainer support structure 304 may include a sidewall 314 and may include an upper side 316 and a lower side 318. The upper side 316 and the lower side 318 may be generally opposed to one another in the vehicle-vertical direction and form a space 320. The space 320 and sidewall 314 may be nested within the space 312.

[0024] The bumper cover retainer 302 may be formed of a different material than the retainer support structure 304. For example, the bumper cover retainer 302 may be formed of a metal, such as steel, and the retainer support structure 304 may be foinied of a plastic, such as polypropylene. Combinations of materials may be used. Any suitable methods may be used to form the bumper cover retainer 302 and the retainer support structure 304, such as machining, molding, etc.

[0025] Still referring to FIG. 3, the upper bumper cover portion 102 may include an upper wall 126 having a rear edge 128, a lower wall 130, and an exterior wall 132. The upper wall 126, the rear edge 128, the lower wall 130, and the exterior wall 132 may extend in the vehicle-lateral direction substantially the width of the front end assembly 100 (FIG. 1). In some embodiments, the rear edge 128 of the upper wall 126 is sized to nest inside the space 320 of the retainer support structure 304. At some locations, such as the one shown, the rear edge 128 of the upper wall 126 may be spaced from the space 320 provided by the retainer support structure 304. In other locations, the rear edge 128 of the upper wall 126 may be located within the space 320 provided by the retainer support structure 304. The rear edge 128 of the upper bumper cover portion 102, the sidewall 314 of the retainer support structure 304, and the sidewall 306 of the bumper cover retainer 302 may be coupled to one another such that, in the event of a front impact force of a predetermined magnitude or less, there may be reduced relative motion between the rear edge 128 of the upper wall 126 of the bumper cover retainer and the sidewall 306 of the bumper cover retainer 302.

FIG. 3 further shows the relative placement of the upper bumper cover retainer assembly 300 within the front end assembly 100. In some embodiments, the bumper cover retainer 302 and the retainer support structure 304 may be disposed rearward of the upper bumper cover portion 102 in a vehicle-longitudinal direction and below the upper grille assembly 106 in the vehicle-vertical direction. The upper bumper cover portion 102 may be part of a front fascia that extends outwardly from the front of the vehicle 10 in the vehicle-longitudinal direction.

Figure 4A:
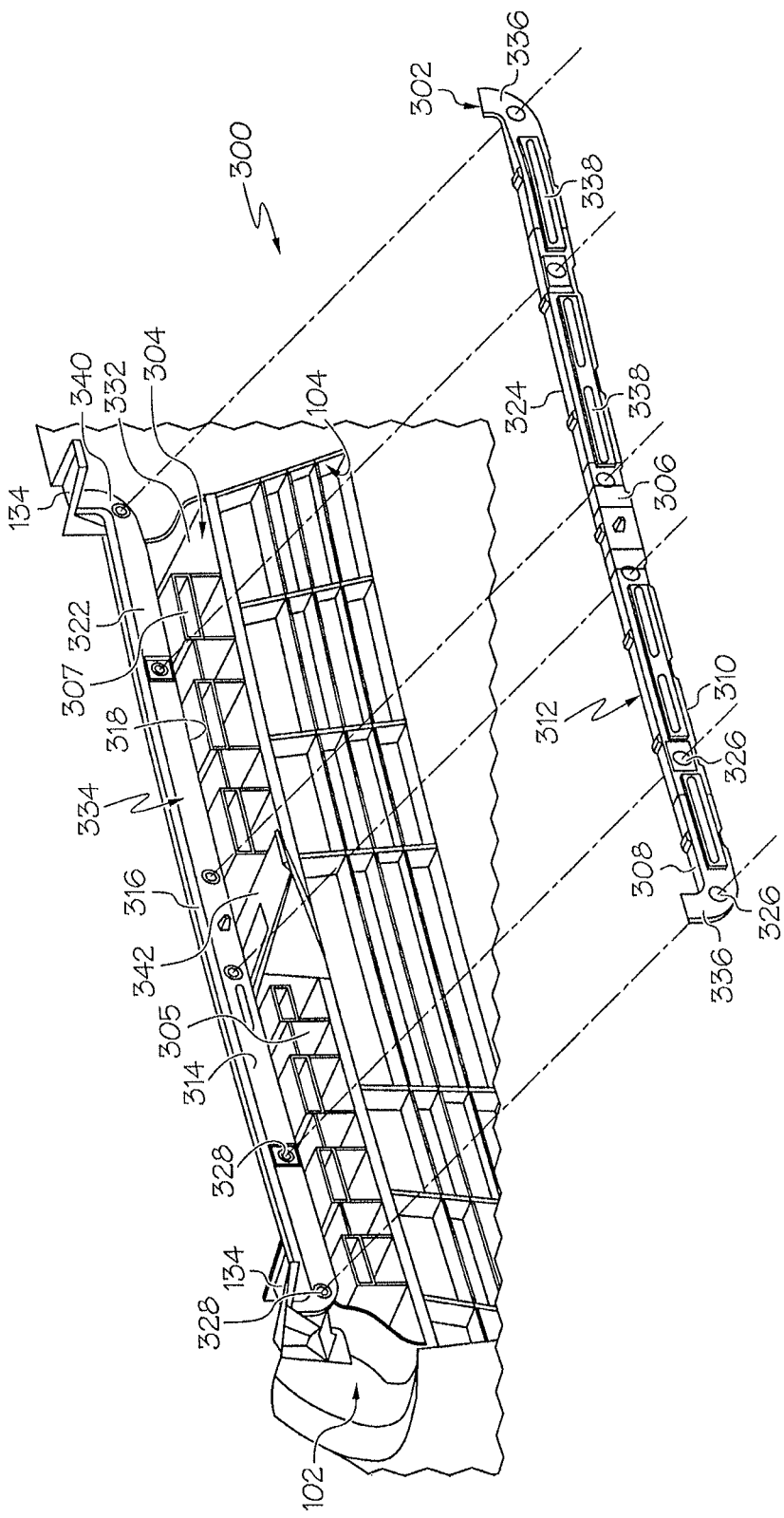
FIG. 4A depicts a perspective exploded view of an upper bumper cover portion and a bumper cover retainer of the bumper assembly of FIG. 1 according to one or more embodiments shown and described herein.
Figure 4B:
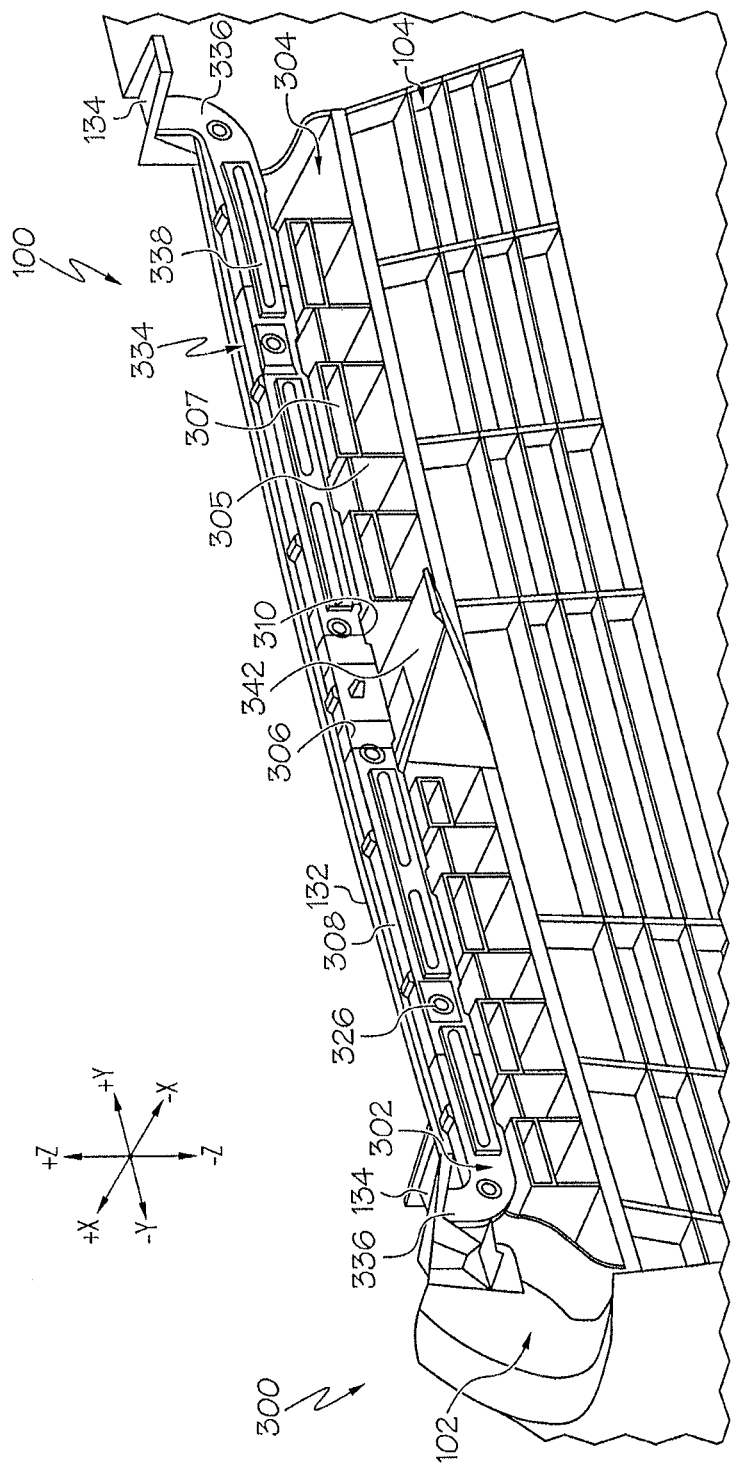
FIG. 4B depicts a perspective assembled view of the upper bumper cover portion and a bumper cover retainer of the bumper assembly of FIG. 4A according to one or more embodiments shown and described herein.

Referring now to FIGS. 4A and 4B, a portion of the front end assembly 100 is depicted with the bumper cover retainer 302 exploded and installed, respectively. FIG. 4A shows the retainer support structure 304 coupled to the upper bumper cover portion 102 and the lower grille assembly 104. The retainer support structure 304 may have a lower portion 332 and an upper portion 334. The lower portion 332 may couple to the lower grille assembly 104 and the upper bumper cover portion 102 and the upper portion 334 may couple to the bumper cover retainer 302. The retainer support structure 304 may extend substantially between the headlamp assemblies 112, 114 (FIG. 5) along the width of the upper bumper cover portion 102 in the vehicle-lateral direction.

In FIG. 4A, the sidewall 314 of the retainer support structure 304 is shown spanning in the vehicle-lateral direction. The sidewall 314 has a contact face 322 that contacts a front face 324 (FIG. 3) of the bumper cover retainer 302. The front face 324 of the bumper cover retainer 302 is a forward-facing face of the sidewall 306 of the bumper cover retainer 302. In some embodiments, the bumper cover retainer 302 may be physically coupled to the upper portion 334 of the retainer support structure 304 at one or more locations along the width of the sidewall 314. The bumper cover retainer 302 may couple to the upper portion 334 of the retainer support structure 304 using one or more screws or other fasteners threaded through one or more holes 326 in the bumper cover retainer 302 and one or more holes 328 in the retainer support structure 304. Further, in some embodiments, the retainer support structure 304 may be coupled to the rear edge 128 (FIG. 3) of the upper bumper cover portion 102 using the screws and the same holes 328 such that the rear edge 128 of the upper bumper cover portion 102, the sidewall 314 of the retainer support structure 304, and the sidewall 306 of the bumper cover retainer are coupled together as discussed above.

Referring also to FIG. 4B, in some embodiments, the bumper cover retainer 302 includes curved ends 336. The curved ends 336 may curve upwards in the vehicle-vertical direction. The curved ends 336 may engage headlamp connection tabs 138 in the event of a front impact to inhibit the rearward movement of the upper bumper cover portion 102 as will be described in greater detail below. Likewise, the upper portion 334 of the retainer support structure 304 may include curved ends 340 for corresponding to the curved ends 336 of the bumper cover retainer 302. Additionally, some embodiments of the bumper cover retainer 302 include slots 338. The slots 338 may be areas of the bumper cover retainer 302 where the steel or other material that comprises the bumper cover retainer 302 may be removed to reduce the overall weight of the vehicle 10.

FIG. 4B depicts an embodiment in which the bumper cover retainer 302 is installed to the retainer support structure 304. In FIG. 4B, the upper portion 334 of the retainer support structure 304 is nested in the space 312 (FIG. 3) formed by the upper side 308 and the lower side 310 of the bumper cover retainer 302 as shown in FIG. 3. FIG. 4B also shows a platform 342 extending from the retainer support structure 304. Embodiments of the retainer support structure 304 may have one or more platforms 342 for coupling the retainer support structure 304 to various other components of the vehicle 10. For example, in the embodiment shown, the platform 342 is used to couple the retainer support structure 304 to the radiator support beam 118. The platform 342 may be coupled to the radiator support beam 118 using one or more bolts or some other connection method (not shown).

In some embodiments, the upper bumper cover portion 102 has one or more bumper cover connection tabs 134 for connecting the upper bumper cover portion 102 to the other components of the front end assembly 100. In some embodiments, the bumper cover connection tabs 134 couple the upper bumper cover portion 102 to the headlamp assemblies 112, 114 through the headlamp connection tabs 138 (FIG. 5).

Figure 5:
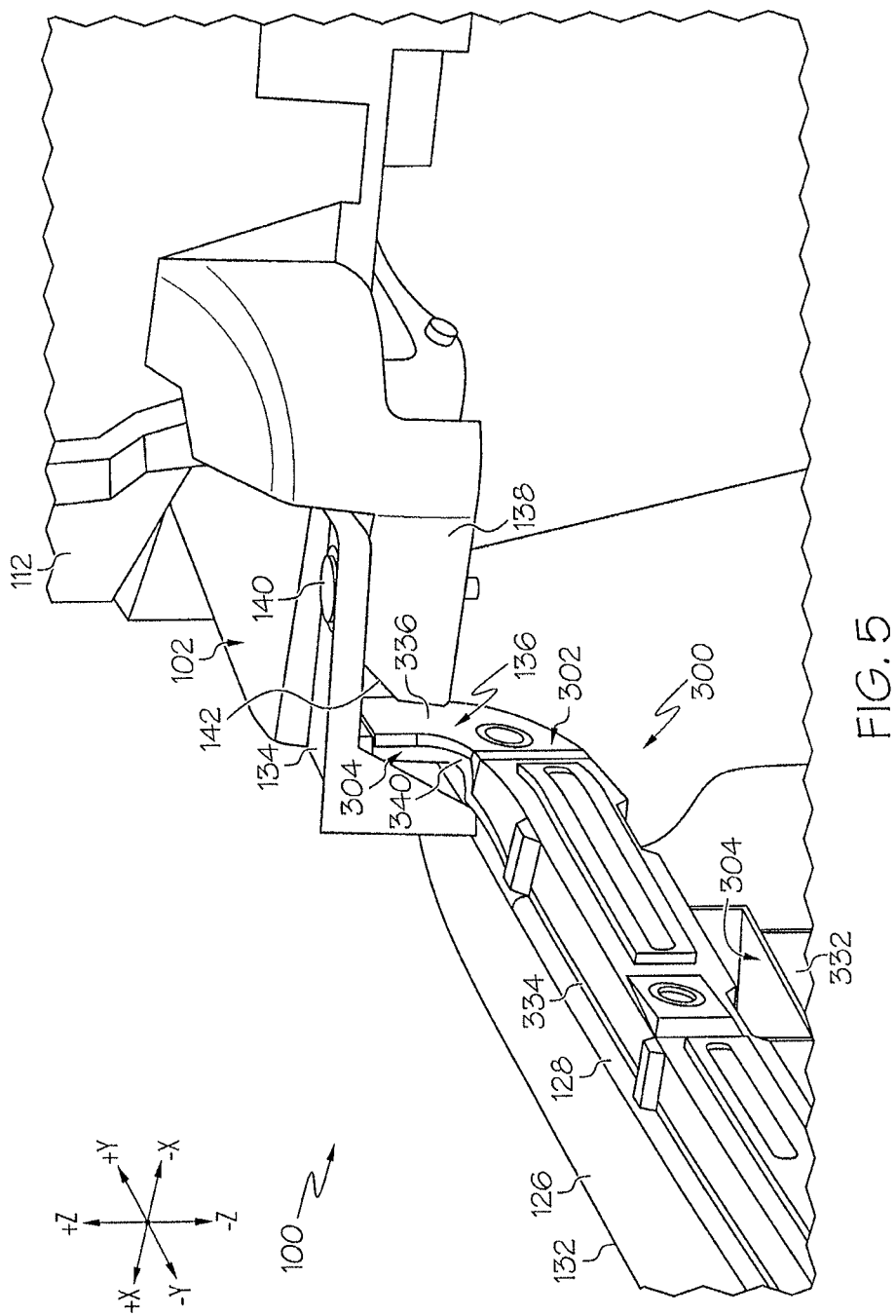
FIG. 5 depicts a detail perspective view of a connection between an upper bumper cover portion, a bumper cover retainer, and a headlamp assembly of the bumper assembly of the vehicle of FIG. 1.

FIG. 5 shows a zoomed in view of the connection between the upper bumper cover retainer assembly 300 and the upper bumper cover portion 102 of the front end assembly 100. FIG. 5 shows only the right side of the vehicle 10, but one or more of the elements or assemblies described herein may be mirrored on the left side of the vehicle 10. As shown, in some embodiments, the bumper cover retainer 302 is coupled to the retainer support structure 304 such that the retainer support structure 304 is between the bumper cover retainer 302 and the upper bumper cover portion 102. Thus, in the event of a front impact causing the upper bumper cover portion 102 to deflect in a vehicle-longitudinal direction, the bumper cover retainer 302 will inhibit the rearward motion of the upper bumper cover portion 102.

As shown in FIG. 5, in some embodiments, the curved ends 336 of the bumper cover retainer 302 mirror the curved ends 340 of the retainer support structure 304. As described above, the curved ends 336, 340 may be curved upward in a vehicle-vertical direction at both ends of the bumper cover retainer 302 and the retainer support structure 304 such that they fit in a gap 136 between the headlamp connection tabs 138 and the bumper cover connection tabs 134 of the upper bumper cover portion 102. In some embodiments, the curved ends 336 may be engaged with the headlamp assemblies 112, 114 at opposite sides of the bumper cover retainer 302 to support the bumper cover retainer 302 in the vehicle-longitudinal direction. In some embodiments, the curved ends 336 may engage an engagement surface 142 of the headlamp assemblies 112, 114 during a front impact of the vehicle 10. In some embodiments, the upper bumper cover portion 102 may be coupled to the headlamp assemblies 112, 114 via a bolt 140 extending through aligning holes in the bumper cover connection tabs 134 and the headlamp connection tabs 138.

In operation, as shown in FIG. 3, as a leg impact assembly 400 comes into contact with the upper bumper cover portion 102, the upper bumper cover portion may deflect rearward in the vehicle-longitudinal direction. The upper bumper cover retainer assembly 300 will reinforce the upper bumper cover portion 102 through the relatively stiff retainer support structure 304 and bumper cover retainer 302 and inhibit rearward movement of the upper bumper cover portion 102. In the event of an impact with a leg impact assembly 400 that causes deflection of the upper bumper cover retainer assembly 300, the headlamp connection tabs 138 (which are coupled to the vehicle 10 frame through the headlamp assemblies 112, 114) will engage the curved ends 336 of the bumper cover retainer 302 and further inhibit movement of the upper bumper cover portion 102 relative to the vehicle 10.

Thus, the upper bumper cover portion 102 tends to apply a force against an upper portion 402 of the leg impact assembly 400 in the event of a front impact. This causes a moment 408 around joint 406. This moment 408 around joint 406 may counteract other moments developed on the leg impact assembly 400 by components of the front end assembly 100 that may strike the leg impact assembly 400 at lower points on the leg impact assembly 400, for example on the lower portion 404 of the leg impact assembly 400. Portions of the front end assembly 100 such as the lower grille assembly 104 may impact the leg impact assembly 400 before the upper bumper cover portion 102 because they may be extend from the front end assembly 100 farther than the upper bumper cover portion 102 in certain embodiments.

Thus, in such embodiments, a moment will be developed on the leg impact assembly at the point of impact with the lower grille assembly 104. By reinforcing the upper bumper cover portion 102, rearward deflection of the upper bumper cover portion 102 is prevented and the counteracting moment 408 can be created.

The above-described bumper assemblies provide bumper cover retainers that may engage the bumper cover as the bumper cover moves rearward in the vehicle-longitudinal direction during a front impact and reinforce the upper portion of the bumper cover against further longitudinal movement. Such an arrangement where bumper cover retainers are used can distribute impact forces more evenly along the vehicle-vertical direction which can reduce a bending moment on a leg impactor, thus improving leg impact test results. The bumper cover retainers may be formed of a material (e.g., metal) that is harder than the bumper cover, which can provide increased reinforcement against movement of the bumper cover. Further, the bumper cover retainers may be positioned behind an upper wall of the bumper cover to specifically reinforce the upper wall against movement during a front impact at an upper location on the front assembly of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   an upper bumper cover portion including an upper wall, a lower wall, and an exterior wall facing forward in a vehicle-longitudinal direction that extends between the upper wall and the lower wall; and
   a bumper cover retainer that extends along a width of a rear edge of the upper wall, the bumper cover retainer having a sidewall that engages the upper wall of the upper bumper cover portion as the upper wall deflects rearward in the vehicle-longitudinal direction in response to a front impact to the upper bumper cover portion to inhibit movement of the upper wall rearward in the vehicle-longitudinal direction.

2. The vehicle of claim 1, wherein the bumper cover retainer extends substantially an entire width of the rear edge of the upper wall of the upper bumper cover portion in a vehicle-lateral direction.

3. The vehicle of claim 1 further comprising a retainer support structure including a sidewall that is disposed between the rear edge of the upper wall of the upper bumper cover portion and the sidewall of the bumper cover retainer.

4. The vehicle of claim 3, wherein the bumper cover retainer comprises curved ends that curve upwards in a vehicle-vertical direction into a space between the upper bumper cover portion and a headlamp housing.

5. The vehicle of claim 4, wherein the curved ends of the bumper cover retainer engage the headlamp housing inhibiting movement in the vehicle-longitudinal direction in response to an impact force to the upper bumper cover portion in the vehicle-longitudinal direction.

6. The vehicle of claim 2, wherein the upper bumper cover portion is disposed above a bumper reinforcement beam.

7. The vehicle of claim 2, wherein the bumper cover retainer comprises a metal and the retainer support structure comprises a plastic.

8. The vehicle of claim 2, wherein the bumper cover retainer comprises an upper side extending outwardly from the sidewall of the bumper cover retainer and a lower side extending outwardly from the sidewall of the bumper cover retainer opposite the upper sidewall forming a space therebetween, the sidewall of the retainer support structure located in the space between the upper sidewall and the lower side of the bumper cover retainer.

9. A front end assembly for a vehicle comprising:
   an upper bumper cover portion including an upper wall, a lower wall, and an exterior wall facing forward in a vehicle-longitudinal direction that extends between the upper wall and the lower wall; and
   a bumper cover retainer that extends along a width of a rear edge of the upper wall, the bumper cover retainer having a sidewall that engages the upper wall of the upper bumper cover portion as the upper wall deflects rearward in the vehicle-longitudinal direction in response to a front impact to the upper bumper cover portion to inhibit movement of the upper wall rearward in the vehicle-longitudinal direction.

10. The front end assembly of claim 9, wherein the bumper cover retainer extends substantially an entire width of the rear edge of the upper wall of the upper bumper cover portion in a vehicle-lateral direction.

11. The front end assembly of claim 9 further comprising a retainer support structure including a sidewall that is disposed between the rear edge of the upper wall of the upper bumper cover portion and the sidewall of the bumper cover retainer.

12. The front end assembly of claim 11, wherein the bumper cover retainer comprises curved ends that curve upwards in a vehicle-vertical direction into a space between the upper bumper cover portion and a headlamp housing.

13. The front end assembly of claim 12, wherein the curved ends of the bumper cover retainer engage the headlamp housing inhibiting movement in the vehicle-longitudinal direction in response to an impact force to the upper bumper cover portion in the vehicle-longitudinal direction.

14. The front end assembly of claim 10, wherein the upper bumper cover portion is disposed above a bumper reinforcement beam.

15. The front assembly of claim 10, wherein the bumper cover retainer comprises a metal and the retainer support structure comprises a plastic.

16. The front end assembly of claim 10, wherein the bumper cover retainer comprises an upper side extending outwardly from the sidewall of the bumper cover retainer and a lower side extending outwardly from the sidewall of the bumper cover retainer opposite the upper sidewall forming a space therebetween, the sidewall of the retainer support structure located in the space between the upper sidewall and the lower side of the bumper cover retainer.

17. A method of changing a characteristic of a front end assembly, the method comprising:
   providing an upper bumper cover portion including an upper wall, a lower wall, and an exterior wall facing forward in a vehicle-longitudinal direction that extends between the upper wall and the lower wall; and providing a bumper cover retainer that extends along a width of a rear edge of the upper wall, the bumper cover retainer having a sidewall that engages the upper wall of the upper bumper cover portion as the upper wall deflects rearward in the vehicle-longitudinal direction in response to a front impact to the upper bumper cover portion to inhibit movement of the upper wall rearward in the vehicle-longitudinal direction.

18. The method of claim 17, wherein the bumper cover retainer extends substantially an entire width of the rear edge of the upper wall of the upper bumper cover portion in a vehicle-lateral direction.

19. The method of claim 17 further comprising a retainer support structure including a sidewall that is disposed between the rear edge of the upper wall of the upper bumper cover portion and the sidewall of the bumper cover retainer.

20. The method of claim 19, wherein the bumper cover retainer comprises curved ends that curve upwards in a vehicle-vertical direction into a space between the upper bumper cover portion and a headlamp housing.

\* \* \* \* \*

UNITED STATES PATENT AND TRADEMARK OFFICE
CERTIFICATE OF CORRECTION

PATENT NO. : 10,525,917 B2
APPLICATION NO. : 15/686486
DATED : January 7, 2020
INVENTOR(S) : Mingher Fred Shen, Nicholas H. Augustyn and Revathy Dasan Muthiah Page 1 of 1

It is certified that error appears in the above-identified patent and that said Letters Patent is hereby corrected as shown below:

In the Specification

In Column 4, Line 24, delete "100241".
In Column 4, Line 33, delete "100251".

Signed and Sealed this
Third Day of March, 2020

Andrei Iancu
*Director of the United States Patent and Trademark Office*